United States Patent [19]

Babsch et al.

[11] 4,446,367
[45] May 1, 1984

[54] PULSE-PRODUCING TRANSDUCER

[75] Inventors: Alfred Babsch, Ulm-Söflingen; Gerhard Lohrmann, Elchingen, both of Fed. Rep. of Germany

[73] Assignee: Mannesmann AG, Duesseldorf, Fed. Rep. of Germany

[21] Appl. No.: 302,839

[22] Filed: Sep. 16, 1981

[30] Foreign Application Priority Data

Apr. 15, 1980 [DE] Fed. Rep. of Germany ....... 3014821

[51] Int. Cl.³ .............................................. G01D 5/38
[52] U.S. Cl. ................................ 250/231 SE; 250/233
[58] Field of Search ............ 250/231 SE, 233, 237 G; 324/175; 340/347 P

[56] References Cited

U.S. PATENT DOCUMENTS 3,902,063  8/1975  Oelsch et al. ............. 250/231 SE X
4,247,769  1/1981  Warner ...................... 250/237 G X Primary Examiner—David C. Nelms
Assistant Examiner—Edward P. Westin
Attorney, Agent, or Firm—Ralf H. Siegemund

[57] ABSTRACT

A linear or annular optical grating cooperates with a detector unit having two detectors on the front face of a carrier member of rotational symmetry and being either directly rotatable through a rear-face screwdriver slot, or via a cam-operated lever, the cam being rotatable by screwdriver action. The two detectors are aligned along a diameter line of the carrier member and will produce two phase-shifted pulse trains upon relative movement between the detection unit and the grating. The preferred field of application is matrix printers, the grating defining print position.

10 Claims, 5 Drawing Figures

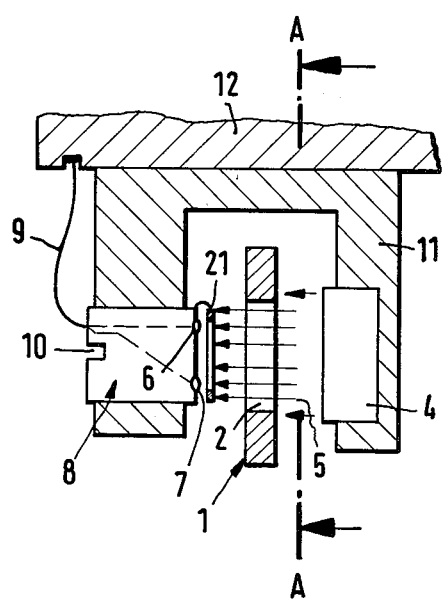
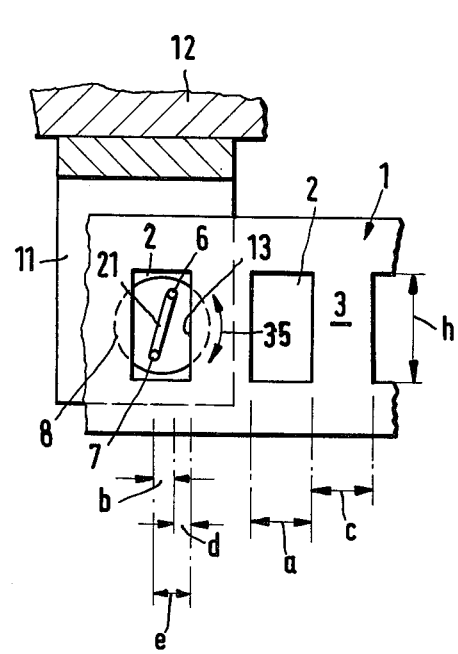

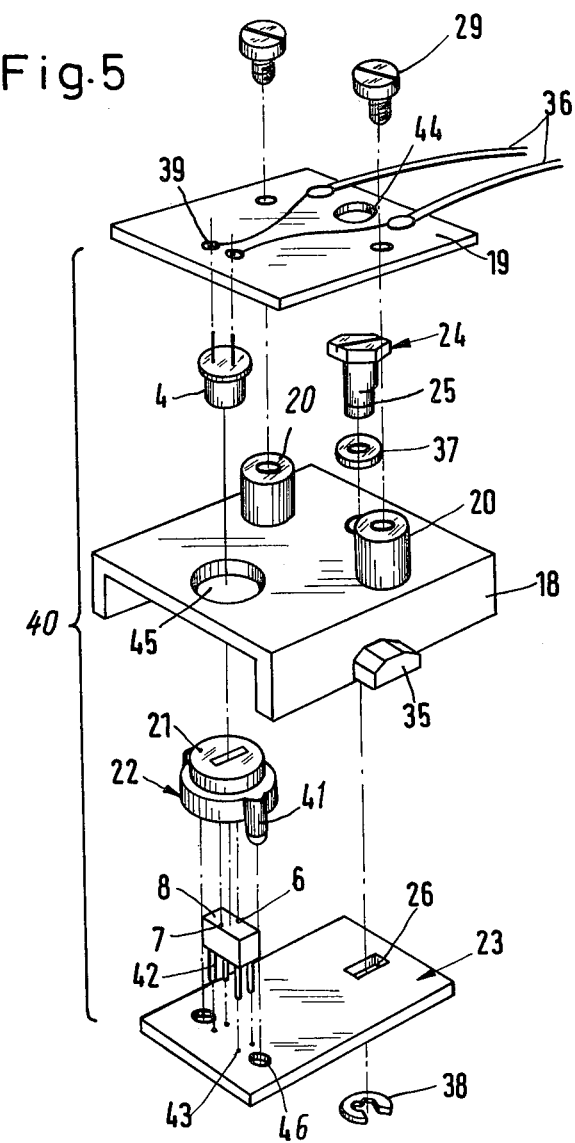

PULSE-PRODUCING TRANSDUCER

BACKGROUND OF THE INVENTION

The present invention relates to a source of electrical pulses; and more particularly, the invention relates to the production of electrical pulses pursuant to measuring position and/or speed and/or direction of moving machine parts.

Transducers of the type which produce measuring pulses are, for example, constructed to include a source of radiation (e.g., light), an optical-electronic pickup and scanner, and a diaphragm such as a slotted disk, i.e., an optical grating. The rotation of the disk presents the motion to be analyzed and divides that motion into a plurality of well-defined individual steps. The motion to be analyzed may be directly rotational in character or a translatory motion converted into rotation for purposes of transduction and measurement. Alternatively, linear gratings have been used for that purpose. Of particular interest is the field of matrix printer, and, here particularly, the motion of the print head on a carriage across the sheet to be printed on; paper-feeding devices; etc.

The individual steps referred to above are represented as pulses, whereby particularly the speed of the machine part is represented by the pulse rate frequency, and each pulse represents a particular position of that part. Refinement of the transduction permits also the production of two pulse trains whose relative phase may represent the direction of movement. Equipment of this kind includes usually a counter for purposes of acquiring exact data on position, speed and/or the direction of motion.

The double-pulse train method for purposes of direction-finding usually involves a phase shift of 90° between the pulses of the two trains, and the distinction between lagging and leading establishes the requisite directional information. Usually, one uses here two light sources and two detectors. The resulting two detection channels and light barriers are sufficiently offset to avoid interference. In view of the similarity and strict periodicity of the slots, it is not necessary that these channels be offset by 90° in relation to the same slot; but the offset may additionally involve an integral multiple of the slotspacing. It was found that the structure, realizing such a concept, is, in fact, very complicated and expensive particularly in regard to adjustment but also in regard to manufacture and installation because one needs to adjust the phase shift quite exactly to 90°.

German printed patent application 23 93 874 (see also U.S. Pat. No. 3,902,063) describes a photoelectric scanner, in which two detector-scanners are mounted on a carrier which is rotatable about an axis extending between the two scanners. These two scanners are associated with a common detection field. The carrier is provided with adjustment slots being concentric to that axis, and screws traversing these slots fasten the carrier in an adjusted position. This device is very expensive, in particular regarding the angular adjustment feature. Furthermore, manufacture and installation require extremely low tolerances. Moreover, the adjustment requires three screws just for arresting the carrier in the adjusted position, and again they must meet very close tolerances. This approach is not deemed desirable; particularly, the expense is not justified in relation to actually attainable accuracy.

DESCRIPTION OF THE INVENTION

It is an object of the present invention to improve a transducer station which includes an optical grating, an illuminating source, and optical detection structure, there being relative movement between the grating and the structure; the improvement involves particular dual, phaseshifted scanning and pickup by the detector structure.

In accordance with the preferred embodiment of the present invention, it is suggested to improve the station, which is the object of the invention, by establishing in the detection structure a bore of rotational symmetry receiving a matching carrier member, having a front face with two detectors. The member may have a rear-face with a screwdriver slot for rotating the member in the bore, thereby turning the line along which the detectors are aligned. This adjustment affects the alignment and phase of the detectors vis-à-vis the grating, and proper rotational adjustment of that carrier member permits adjustment of the detector outputs (pulse trains) to have the desired phase shift. Alternatively, the detector carrier member may be provided with an actuating lever acted upon by a cam arrangement which, in turn, is operated by an adjusting screw whose head has a screwdriver slot for affecting turning thereof.

The grating may be linear or annular, the detectors may move relative to the grating, or vice versa. The bore is preferably of cylindrical, threaded configuration, the detector carrier functioning as a fine spindle accordingly. The threads ensure the axial position and act as fine position guides for the turning adjustment of the alignment of the detectors in a plane parallel to the plane of the grating.

A diaphragm with slot is disposed in front of the detectors, each being near one end of the slot. This diaphragm enhances the modulation detection resulting from the relative movement of the grating; stray light is to be excluded as much as possible. In the case of a rotating grating disk, the station will be radially positioned relative to the tracks of that disk.

The preferred embodiment of the invention, the objects and features of the invention, and further objects, features and advantages thereof, will be better understood from the following description taken in connection with the accompanying drawings.

DESCRIPTION OF THE DRAWINGS

FIG. 1 illustrates a cross section through a detection station for purposes of acquiring translatory position and motion data, and incorporating a corresponding example for practicing the preferred embodiment of the invention in accordance with the best mode thereof;

FIG. 2 is a section taken along line A—A in FIG. 1;

FIG. 5 is an exploded perspective view of a scanning unit being part of the device shown in FIGS. 3 and 4.

Figure 3:
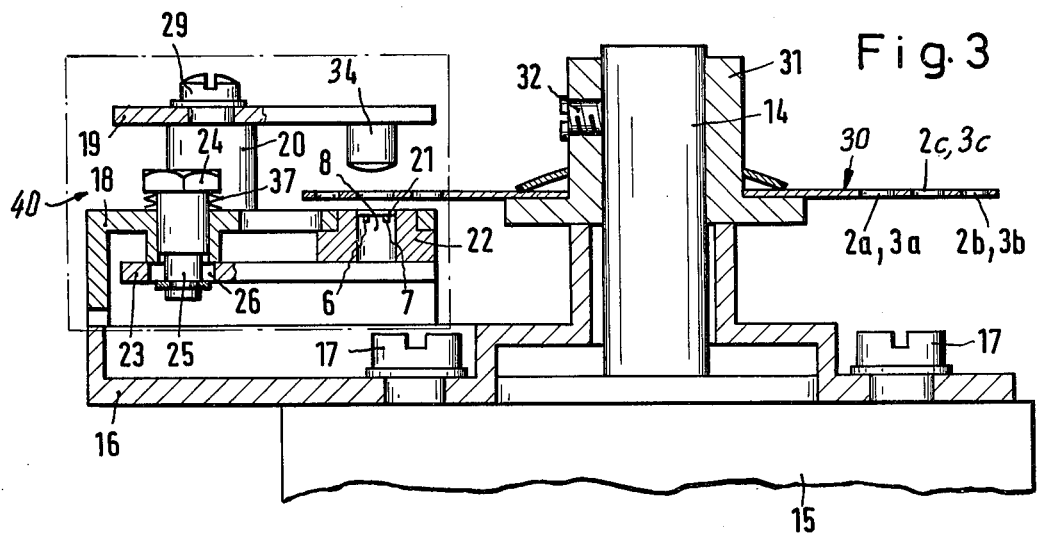
FIG. 3 is a cross section through a station acquiring rotational data as per another example of the preferred embodiment.

Proceeding now to the detailed description of the drawings, reference is made particularly to FIG. 1 illustrating a portion of a carriage 12 which may carry a print head for a matrix printer. Generally speaking, this carriage moves in directions transverse to the plane of FIG. 1 and to the left or to the right as per FIG. 2. This carriage carries also a support element 11 having a U-shaped profile and constituting the structural support for the important operative components of this particular scanning station.

This displaceable scanning station cooperates with a flat stationary bar 1 having a plurality of rectangular slots 2 (or transparent regions) separated by opaque bars 3 in a highly accurate periodic arrangement. The bar 1 and the slot pattern, in particular, extend colinearly with the direction of movement of the carriage 12. Bar 1 constitutes a linear optical grating for this particular example.

One leg of support member 11 is provided with a source 4 of light, emitting light as indicated by arrows 5. The source is constructed to provide an illumination field that covers at least one slot 2 of the grating; conceivably, that field may be larger to cover more than one slot. The other leg of member 11 is provided with a cylindrical threaded bore matingly receiving a threaded cylindrical member 8.

The member 8 has a front face, and two radiation detectors 6 and 7 are arranged on that front face along a diameter line. Member 8 thus constitutes a detection carrier or carrier member. A slot diaphragm 21 is mounted to member 8, in front of its front face and in such a manner that the two detectors 6 and 7 are aligned with opposite ends of that slot. The rear face of carrier member 8 is provided with a screwdriver slot 10 for turning of the member 8 in spindle fashion to, thereby, adjust the orientation of the diameter line on which detectors 6 and 7 are situated. The threaded engagement between carrier member 8 and the threaded bore in one leg of mounting piece 11 ensures tight guidance of the carrier member and positive retention of any adjusted position. Additional fastening is not required.

The spacing between detectors 6 and 7 is smaller than the height h of the slots (see FIG. 2). The position of detectors 6 and 7 is adjusted so that the diagonal line between them has an angle of less than 90° to the direction of movement of the carriage. Consequently, the position of the detectors as projected onto a line colinear with that direction finds the detectors spaced by a distance b. If that distance b is exactly one fourth of the slot-center-to-slot-center distance (or one half of a slot width (a) of the slots 2, being as wide as the in-between bars 3 having width C), then the two detectors 6 and 7 scan with a phase shift of 90° of the periodically repeated slot pattern of the grating.

The carriage 12 is shown in a particular instantaneous position relative to the slotted bar 1 in which the distance of detector 6 from one edge of the respective slot is d, while the detector 7 is spaced from the same edge by the distance e so that e=d+b.

In a typical case, for a matrix printer, slot width a is approximately 0.3 mm and slot height h is 2.5 to 3.0 mm; the spacing between the detectors 6 and 7 is, for instance, 1.5 mm. The adjustment of the angle of the line betwen detectors 6 and 7 is not carried out by physical measurement but by means of an oscilloscope displaying the outputs of the detectors while the carriage 12 is shifted. The carrier 8 is just turned until the output signals are 90° out of phase.

In operation, the signals from the detectors are fed to a counter. The sequence of arrival determines the direction of carriage movement. The count number represents the position of the part 12, and count number per unit time represents the speed.

Figure 4:
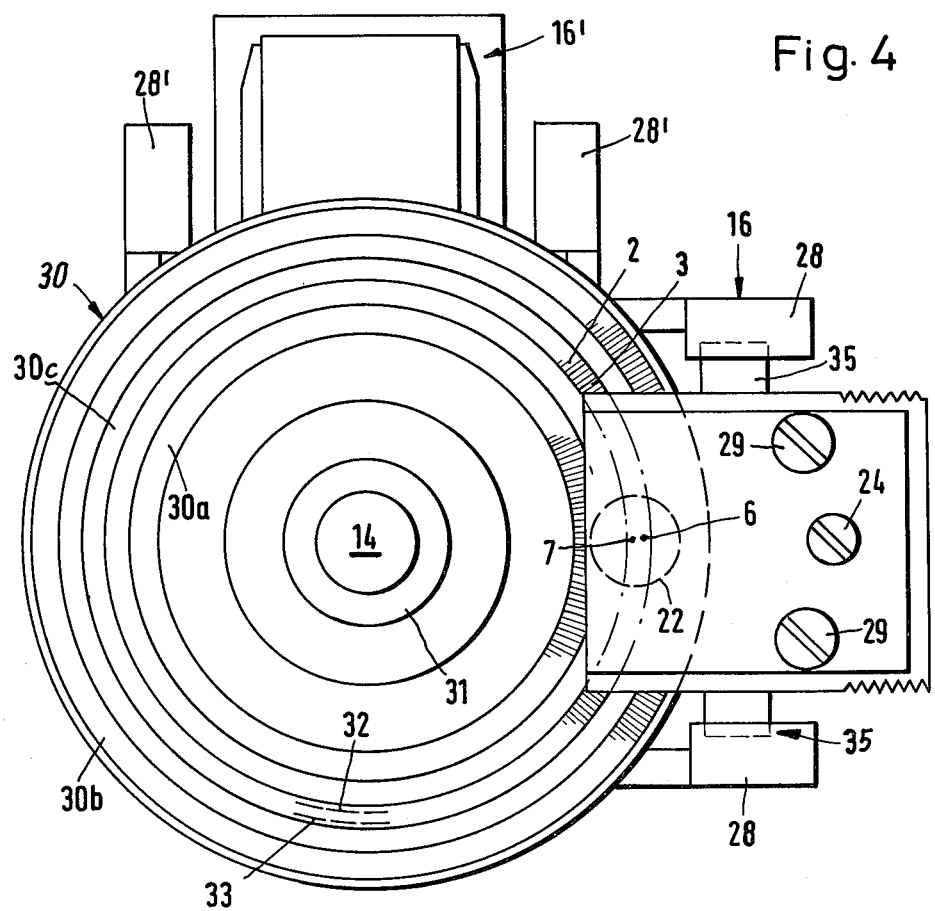
FIG. 4 is an elevation of the station shown in FIG. 3.

FIGS. 3 and 4 illustrate a detection station for acquiring data on a rotational device such as a shaft 14 of a motor 15. The fact that the shaft 14 is shown to be driven directly by a motor is by way of example only, the rotation may be derived from any suitable source. Since the preferred (though not exclusive) form of application is in the field of matrix printers, this motor may stand in representation of a drive for a platen drum or the like. However, the carriage of a matrix printer is usually driven via a belt drive or the like, driven by a motor, and motor 15 can be deemed representative thereof. In any event, a particular disk 30 is secured to a hub element 31 which, in turn, is fastened to the shaft 14 by means of a screw 32.

A stationary frame 16 is, for example, fastened to the motor case by means of screws such as 17. A scanning unit 40 is mounted to that frame. The unit 40 has a lower mounting and support plate 19 and an upper support element 18. The exploded view of unit 40 reveals further that the bottom member 18 is provided with laterally extending guide pieces 35 which are inserted (FIG. 4) in guide members 28 which, in turn, constitute parts or extensions of Frame 16. Any electrical connections to and from unit 40 run through the guide pieces 35, or one thereof, acting as plugs accordingly.

The upper member or element 18 is mounted to plate 19 by means of two spacers 20, screws 29 hold the assembly 18, 19, 20 together. The upper plate 19 carries a source of radiation 34 and is provided with sockets 39 for insertion of contact pins of the light source 34; wire ends of a cable 36 run across plate 19 and are connected to the sockets 39. The cover-like support element 18 is provided with a cylindrical bore 45 into which is threaded a socket 22. The socket 22, in turn, has a rectangular opening into which is fitted a detector carrier 8, carrying two detectors 7 and 6. The socket 22 and the inserted carrier 8 together constitute the rotatable detector carrier member in this example.

A one-arm adjustment plate 23 is connected to socket 22, in that arms such as 41 are received in openings 46 in plate 23. The plate 23 is, thus, journaled in element 18 (bore 45) via socket 22. Contact or terminal pins 42 extend from the detector carrier 8 and are inserted in appropriate socket holes 43 of plate 23. The free end of lever 23 is provided with a cam track-like opening 26 engaging an eccentric cam element 25 on an adjusting pin 24. The pin 24 may have a hex head for initial positioning by means of an appropriate wrench. Pin 24 is inserted in a suitable bore in support element 18 for rotation therein. Preferably, that head is provided with a screwdriver slot for turning of pin 24. A clamp 38 retains the pin 24 axially in plate 18, a spring 37 ensures positive engagement with lever plate 23. An opening 44 in the upper support plate 19 is aligned with the head of pin 24 for access thereto, particularly for insertion of a screw driver, for turning of the pin to, thereby, adjust the pivot angle of the socket 22 and of the slot diaphragm 21 in front of the detectors 6 and 7. This way, one adjusts the angle of the line between the detectors in the detection plane.

It can readily be seen that the assembly 24 25 26 23 functions as a reducing stage: a relatively large turn of adjusting screw 24 produces only a relatively small turning angle of socket 22. This feature enhances greatly the accuracy and precision of adjsting the oblique alignment of the detectors 6 and 7 relative to a radial line of disk 30.

The disk 30 is provided with a plurality of concentric tracks 30a, 30b, and 30c. These tracks are respectively comprised of alternatingly arranged radial slots and spacer bars; there are accordingly radial slots 2a, 2b, and 2c for respectively three tracks 30a, 30b, and 30c, and these slots are separated by bars 3a, 3b, and 3c respectively. Typically, a track may have two hundred slots. If, as contemplated, the drive is provided for moving a print head across a platen for and in a matrix printer; the slots define print positions and character spacing. Different tracks may, therefore, be used to obtain different spacings between characters.

FIG. 4 shows the detectors 6 and 7 in a scanning position for center track 30c. Reference numerals 32 and 33 identify subtracks of slot track 30c. These subtracks are not physically defined; rather, they identify the portions of track 30c, respectively scanned by detectors 7 and 6 when having the desired orientation.

As far as the dual scanning head 8 is concerned, turning of fitting or socket 22 in bar 45 adjusts the line defined by the two detectors 6 and 7 vis-à-vis the center of rotation of the disk and to a radial line with reference thereto. Any slot of the tracks is always radially aligned with respect to that center of rotation, and turning of head 8 and socket 22 adjusts the angle of the line between the detectors 6 and 7 relative to and from a radial alignment. In this regard, the adjustment is analogous to the one described above; one will produce two pulse trains, and their relative phase depends upon the radial misalignment of the two detectors.

Each of these tracks 30a, 30b, and 30c may have a different resolution. That is to say, the total number of slots per track may differ. Thus, one may, at times, wish to change scanning from one track (e.g., 30c) to another one. The illustrated example actually provides for two possibilities. One instance can be realized by releasing the unit 40 from its guides 28 and replacing it by another one whose socket 22 is mounted geometrically differently so that its head (equivalent to 8) is located adjacent to track 30a or track 30b, as the case may be. This, of course, requires a simple replacement step. However, operation is interrupted during the replacement.

An alternative possibility is established by a second set of guides, 28, into and onto which one may place a second scanning unit, 40. This unit will be provided in order to scan another track, e.g., 30b. If that second unit 40 is concurrently present, one may switch over from one track to another without any delay. Moreover, one may even operate with different tracks concurrently.

We claim:

1. A transducer station which includes an optical grating and a support member, the grating and the member being movable relative to each other along the direction of extension of the grating, there being a source of radiation on the member, the grating having a disposition so that the source illuminates the grating, permitting optical pickup, the station further comprising:

means associated with the support member for defining a bore of rotational symmetric contour;

a carrier member rotatably disposed in said bore and having a front face;

a pair of detectors disposed on the front face, the bore and the carrier member being oriented so that the detectors of the pair can be aligned in directions transverse to said direction of extension; and means defining a screwdriver slot and provided for permitting turning of the carrier member to affect aligning of the detectors.

2. A transducer station as in claim 1, the detectors being aligned on the carrier along a diameter line of the face in relation of a point of turning when the carrier member is turned in the bore.

3. A transducer station as in claim 1 or 2, and including a diaphragm on the member having a slot, the detectors being disposed adjacent to ends of the slot.

4. A transducer station as in claim 1, the grating being a linear one.

5. A transducer station as in claim 1, the grating being defined as an annular track on a rotating disk, the associated means including a detachable construction which is radially positionable with respect to said disk.

6. A station as in claim 1, the carrier member having a rear face, the screwdriver slot being directly provided in said rear face.

7. A station as in claim 1, the carrier member being inserted in a socket, said associated means having said bore and including means for mounting the socket for limited turning, the means for mounting including an adjusting screw having said screwdriver slot.

8. A station as in claim 7, the socket being mounted for cam-controlled radial adjustment with respect to said carrier member.

9. A transducer station which includes a rotatable optical grating with at least one annular track, further including illuminating means for the track permitting optical pickup of light as modulated by the rotating grating, the station further comprising:

means having a bore of rotational symmetry;

a carrier member rotatably disposed in said bore and having a front face;

a pair of detectors disposed on the front face along a line, upon turning of the carrier member the said line can be adjusted to coincide with a radial line of the rotating disk or obliquely thereto, the detectors also positioned for detecting said modulation, separately and individually;

a lever for said carrier member;

cam means coupled to a free end of the lever for pivoting the lever, thereby turning said carrier member in said bore; and cam-actuating means for acting on the cam means to adjust the cam means for pivoting the lever.

10. A station as in claim 9, the socket being mounted on a plate having an opening, further including a rotatable cam engaging the opening for moving said plate for obtaining said radial adjustment.

* * * * *